(12) United States Patent
Onodera

(10) Patent No.: US 11,890,760 B2
(45) Date of Patent: Feb. 6, 2024

(54) BALANCER ABNORMALITY DETECTION SYSTEM AND BALANCER ABNORMALITY DETECTION METHOD

(71) Applicant: FANUC CORPORATION, Yamanashi (JP)

(72) Inventor: Yuusei Onodera, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 579 days.

(21) Appl. No.: 17/108,044

(22) Filed: Dec. 1, 2020

(65) Prior Publication Data

US 2021/0197380 A1 Jul. 1, 2021

(30) Foreign Application Priority Data

Dec. 26, 2019 (JP) ................... 2019-236333

(51) Int. Cl.
| | |
|---|---|
| *G01L 3/02* | (2006.01) |
| *B25J 9/16* | (2006.01) |
| *B25J 19/00* | (2006.01) |
| *F16F 3/04* | (2006.01) |
| *F16F 15/023* | (2006.01) |
| *F16F 15/04* | (2006.01) |

(52) U.S. Cl.
CPC ......... *B25J 9/1674* (2013.01); *B25J 19/0008* (2013.01); *G01L 3/02* (2013.01); *F16F 3/04* (2013.01); *F16F 15/0232* (2013.01); *F16F 15/04* (2013.01); *F16F 2230/0011* (2013.01); *F16F 2230/0047* (2013.01)

(58) Field of Classification Search
CPC .. B25J 9/1674; B25J 19/0008; B25J 19/0012; B25J 19/0016; B25J 19/0095; G01L 3/02; F16F 3/04; F16F 15/0232; F16F 15/04; F16F 2230/0011; F16F 2230/0047; F16F 15/067

See application file for complete search history.

(56) References Cited

U.S. PATENT DOCUMENTS

| | | | | |
|---|---|---|---|---|
| 9,102,064 | B2* | 8/2015 | Hayashi | ................. B25J 9/1674 |
| 9,193,074 | B2* | 11/2015 | Hayashi | ................. B25J 9/1694 |
| 10,442,080 | B2* | 10/2019 | Muneto | ................. B25J 9/1605 |
| 10,486,279 | B2* | 11/2019 | Sugiura | ................... H02P 6/28 |
| 11,130,234 | B2* | 9/2021 | Harada | ................. B25J 9/1633 |
| 11,376,731 | B2* | 7/2022 | Fujii | ..................... B25J 13/087 |
| 11,400,606 | B2* | 8/2022 | Kitamura | ............. B25J 19/0012 |
| 2014/0297032 | A1* | 10/2014 | Hayashi | ............... B25J 19/0012 |
| | | | | 700/245 |

(Continued)

FOREIGN PATENT DOCUMENTS

| | | |
|---|---|---|
| JP | 2014-195849 A | 10/2014 |
| JP | 2019-098413 A | 6/2019 |

*Primary Examiner* — Freddie Kirkland, III
(74) *Attorney, Agent, or Firm* — Studebaker & Brackett PC

(57) ABSTRACT

A balancer abnormality detection system includes: a robot; a motor configured to operate the robot; a balancer provided in the robot and configured to generate assist torque which assists power of the motor with force generated by elastic bodies; and a controller configured to detect abnormality of the balancer by measuring a current value of the motor operated to keep a posture of the robot during standby of the robot and comparing the current value with a current command value of the motor necessary for keeping the posture of the robot.

8 Claims, 3 Drawing Sheets

(56) References Cited

U.S. PATENT DOCUMENTS

| | | | |
|---|---|---|---|
| 2014/0297037 A1* | 10/2014 | Hayashi | B25J 9/1694 |
| | | | 700/258 |
| 2019/0160676 A1* | 5/2019 | Harada | B25J 9/1694 |
| 2020/0164529 A1* | 5/2020 | Kitamura | B25J 19/0012 |
| 2021/0069919 A1* | 3/2021 | Fujii | B25J 9/1633 |

* cited by examiner

BALANCER ABNORMALITY DETECTION SYSTEM AND BALANCER ABNORMALITY DETECTION METHOD

This application is based on and claims the benefit of priority from Japanese Patent Application 2019-236333, filed on 26 Dec. 2019, the content of which is incorporated herein by reference.

BACKGROUND OF THE INVENTION

Field of the Invention

The present invention relates to a balancer abnormality detection system and a balancer abnormality detection method.

Related Art

Conventionally, in an articulated robot, a balancer that generates force in a direction opposite to a load by gravity is used in order to assist power of a servomotor that drives an axis on which the load by the gravity acts (see Japanese Unexamined Patent Application, Publication No. 2019-98413, for example).

The balancer generates the force for assisting the power of the servomotor by the force generated by an elastic body. As the elastic body, a gas spring which generates elastic force (repulsive force) by compression of a gas, a spring such as a coil spring, and the like are known. Hereinafter, the balancer using the gas spring as the elastic body may be called a gas balancer, and the balancer using the spring as the elastic body may be called a spring balancer.

Patent Document 1: Japanese Unexamined Patent Application, Publication No. 2019-98413

SUMMARY OF THE INVENTION

Generally, a system including an articulated robot is provided with a collision detection function. The collision detection function calculates a difference between a current command value of the servomotor necessary for executing an operation plan of the robot and a current value of the servomotor necessary for actually operating the robot as an estimated disturbance in a predetermined control cycle during a robot operation, and determines that the robot has collided with some object in a case where the estimated disturbance exceeds a predetermined threshold.

For example, in the case where abnormality such as breakage of the spring occurs in the spring balancer, the force (torque) with which the spring balancer assists the operation of the motor becomes small so that the current value when the servomotor is actually operated becomes larger than the current command value supplied to the servomotor. Therefore, it is conceivable that the abnormality of the spring balancer can be detected by comparing the estimated disturbance with the threshold similarly to the case of detecting a collision.

However, the threshold for determining occurrence of a collision in the collision detection function has a fixed margin in order to prevent erroneous detection in the case where the robot is operated with great acceleration/deceleration or in the case where the robot is operated in a state greatly off a preset load, for example. The margin is set larger than a fluctuation portion of the torque of the motor generated by the abnormality of the balancer. That is, a torque fluctuation of the motor generated by the abnormality of the balancer is smaller than the torque fluctuation of the motor generated by the collision during the robot operation. Therefore, it is difficult to detect the abnormality of the balancer by the collision detection function. Thus, it is desired to be able to easily detect the occurrence of the abnormality in the balancer.

A balancer abnormality detection system relating to one aspect of the present disclosure includes: a robot; a motor configured to operate the robot; a balancer provided in the robot, provided with elastic bodies, and configured to generate assist torque which assists power of the motor with force generated by the elastic bodies; and a controller configured to detect abnormality of the balancer by measuring a current value of the motor operated to keep a posture of the robot during standby of the robot and comparing the current value with a current command value of the motor necessary for keeping the posture of the robot.

A balancer abnormality detection method relating to one aspect of the present disclosure is an abnormality detection method for a balancer provided in a robot operated by a motor and configured to generate assist torque which assists power of the motor by force generated by elastic bodies, the balancer abnormality detection method including: detecting abnormality of the balancer by measuring a current value of the motor operated to keep a posture of the robot during standby of the robot and comparing the current value with a current command value of the motor necessary for keeping the posture of the robot.

According to one aspect, occurrence of abnormality in the balancer can be easily detected.

DETAILED DESCRIPTION OF THE INVENTION

Figure 1:
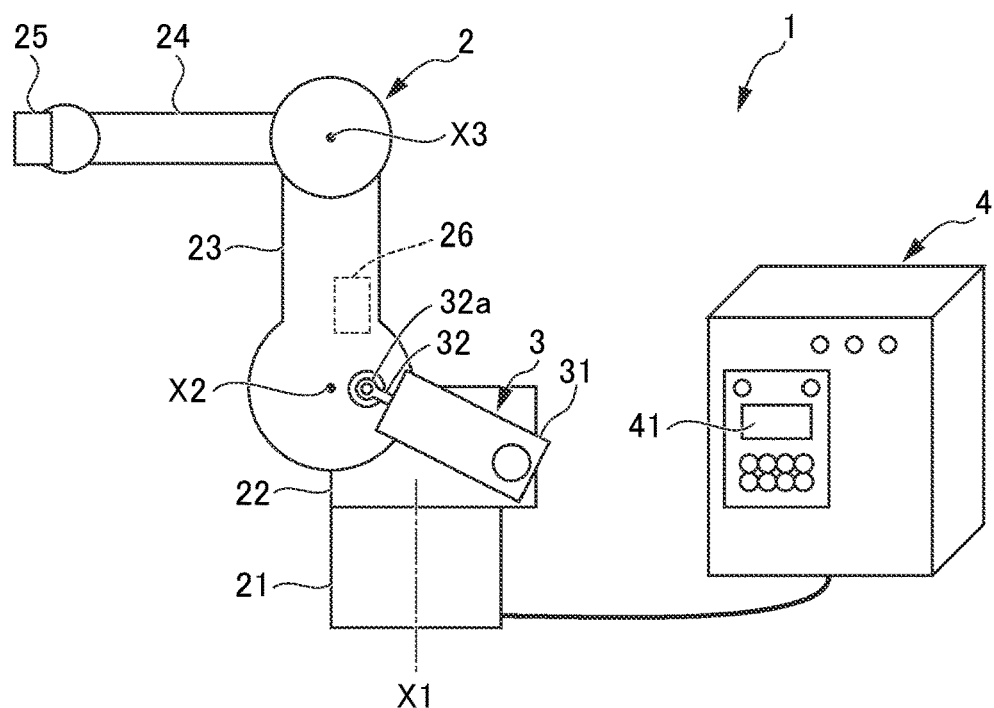
FIG. 1 is a diagram illustrating a constitution of a balancer abnormality detection system relating to one aspect of the present disclosure.

Hereinafter, one aspect of the present disclosure will be described in detail with reference to the drawings. As illustrated in FIG. 1, a balancer abnormality detection system 1 is provided with: a robot 2; a balancer 3; and a controller 4 configured to control the robot 2.

The robot 2 includes: a base part 21 fixed to a floor surface; a turning part 22 supported so as to be rotatable about a first axis X1 vertical to the base part 21; a first arm part 23 rotatable about a second axis X2 horizontal to the turning part 22; a second arm part 24 rotatable about a third axis X3 at a tip of the first arm part 23; and a wrist unit 25 supported at a tip of the second arm part 24. Inside the first arm part 23, a servomotor 26 which operates the first arm part 23 is arranged.

Figure 2:
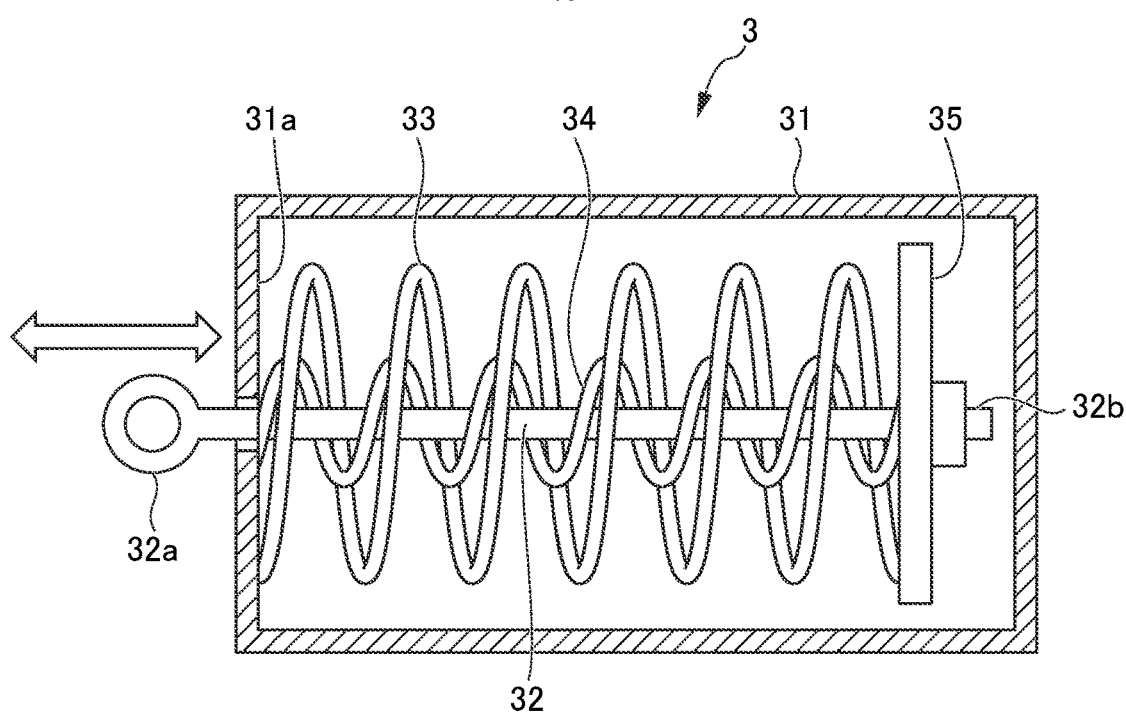
FIG. 2 is a diagram illustrating an internal structure of a balancer.

The balancer 3 is provided between the turning part 22 and the first arm part 23 of the robot 2. The balancer 3 illustrated in the present embodiment is, as illustrated in FIG. 2, a spring balancer in which two coil springs 33 and 34 as elastic bodies are housed inside a housing 31. Inside the housing 31, a rod part 32, a tip part 32a of which is projected to an outside of the housing 31, is provided. To a rear end part 32b arranged inside the housing 31 in the rod part 32, a stopper part 35 is attached.

Spring constants of the coil spring 33 and the coil spring 34 are different. The coil spring 33 has a diameter larger than that of the coil spring 34, and is arranged on a circumference of the coil spring 34. The coil springs 33 and 34 are arranged coaxially on the circumference of the rod part 32. The coil springs 33 and 34 are mounted in a range from an inner wall surface 31a of the housing 31 arranged on a side of the tip part 32a of the rod part 32 to the stopper part 35. The coil springs 33 and 34 generate energizing force in a direction of retraction into the housing 31 to the rod part 32 through the stopper part 35.

The housing 31 of the balancer 3 is attached to the turning part 22 of the robot 2, and the tip part 32a of the rod part 32 of the balancer 3 is attached to the first arm part 23 of the robot 2. The balancer 3 generates assist torque which assists power of the servomotor 26 by the force generated by the coil springs 33 and 34 that are the elastic bodies. The servomotor 26 is a motor that operates the first arm part 23 on which a large load by gravity acts. Thus, the balancer 3 functions to reduce the load of the servomotor 26 or resist an operation of the first arm part 23, according to the operation of the first arm part 23.

The controller 4 controls the robot 2 to execute various kinds of operations by supplying a current command value to the servomotor 26 of the robot 2. Further, the controller 4 has a collision detection function which detects a collision of the robot 2 with an external object and a balancer abnormality detection function which detects abnormality of the balancer 3.

The collision detection function of the controller 4 is executed during the operation of the robot 2. The phrase "during the operation of the robot 2" means that the robot 2 is in a state of executing a predetermined robot operation by cooperation of the turning part 22, the first arm part 23, the second arm part 24 and the wrist unit 25. The controller 4 which executes the collision detection function calculates, as an estimated disturbance, a difference between a current command value (torque command value) supplied to the servomotor 26 and a current value (actual torque value) of the servomotor 26 actually detected when the robot 2 is operated based on the current command value, in a predetermined control cycle during the operation of the robot 2. The controller 4 compares the calculated estimated disturbance with a predetermined first threshold TH1 for collision detection, and determines that the robot 2 has collided with an external object when the estimated disturbance exceeds the first threshold TH1.

The balancer abnormality detection function of the controller 4 is executed during standby of the robot 2. The phrase "during the standby of the robot 2" means that the robot 2 is in the state of stopping at a predetermined standby position after ending a series of robot operations until starting the next series of robot operations. The servomotor 26 is operated at all times to keep the first arm part 23 in a predetermined posture and generates predetermined torque to the first arm part 23 even during the standby of the robot 2.

Figure 3:
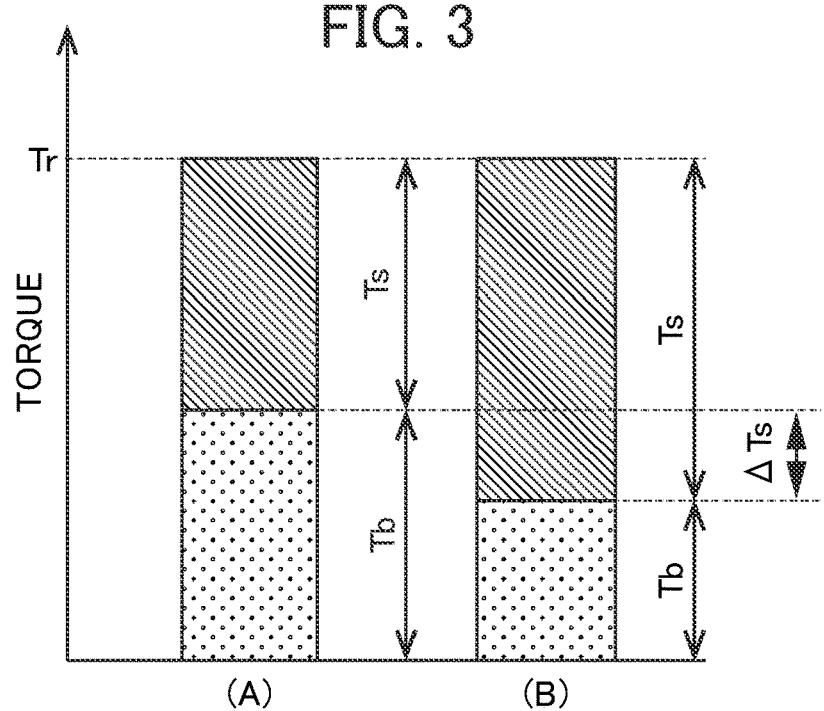
FIG. 3 is a graph describing a torque change of a motor accompanying abnormality of the balancer.

Here, on the first arm part 23 of the robot 2 to which the balancer 3 is attached, as illustrated in FIG. 3, main torque Ts by the servomotor 26 and assist torque Tb by the coil springs 33 and 34 of the balancer 3 simultaneously act, and necessary torque Tr for the operation of the robot 2 is provided. In FIG. 3, (A) illustrates a torque distribution in the case where the balancer 3 normally functions, and (B) illustrates a torque distribution in the case where abnormality occurs in the balancer 3.

Since the balancer 3 functions to reduce the load of the servomotor 26 which operates the first arm part 23, the necessary torque Tr for operating the first arm part 23 is a total of the main torque Ts generated by the servomotor 26 and the assist torque Tb generated by the balancer 3. When abnormality such as breakage occurs in the coil springs 33 and 34 of the balancer 3, the assist torque Tb generated by the balancer 3 declines as illustrated in (B) in FIG. 3. Therefore, in order to secure the necessary torque Tr, it is needed to increase the main torque Ts of the servomotor 26 (increase the current value of the servomotor 26).

A torque increase portion ATs of the servomotor 26 at the time corresponds to a torque decline portion of the balancer 3. That is, in the case where the torque increase portion ATs exceeds a predetermined size, it can be determined that some kind of abnormality such as breakage of the coil springs 33 and 34 has occurred in the balancer 3. However, the torque increase portion ATs is small compared to a torque fluctuation portion normally generated when the robot 2 is operated.

Figure 4:
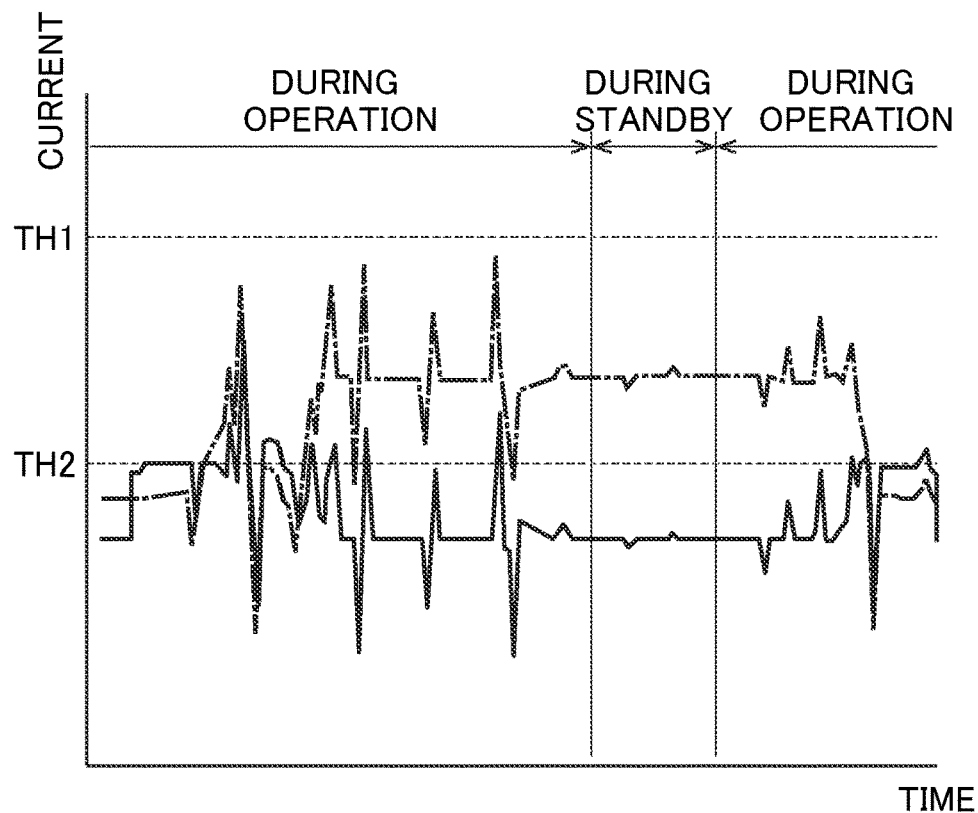
FIG. 4 is a graph describing a change of an estimated disturbance in a normal situation and in an abnormal situation of the balancer.

FIG. 4 illustrates a change of the estimated disturbance in a normal situation (illustrated with a solid line) and in an abnormal situation (illustrated with a dashed line) of the balancer 3. As illustrated in FIG. 4, even when the estimated disturbance is calculated by the collision detection function of the controller 4, the estimated disturbance during the operation of the robot 2 may have no clear difference between the normal situation and the abnormal situation of the balancer 3, and it is difficult to determine the abnormality of the balancer 3.

Therefore, the controller 4 executes the balancer abnormality detection function during the standby of the robot 2. As illustrated in FIG. 4, there is a clear difference between the normal situation (illustrated with the solid line) and the abnormal situation (illustrated with the dashed line) of the balancer 3 during the standby of the robot 2. Therefore, the controller 4 which executes the balancer abnormality detection function detects the abnormality of the balancer 3 by comparing the current command value (torque command value) supplied to the servomotor 26 and the current value (actual torque value) of the servomotor 26 actually detected for keeping the posture of the robot 2 in the predetermined control cycle during the standby of the robot 2.

For details, the controller 4 calculates, as the estimated disturbance, the difference between the current command value of the servomotor 26 necessary for keeping the posture of the robot 2 during the standby and the current value of the servomotor 26 actually detected when the servomotor 26 is driven based on the current command value and the robot 2 performs a posture keeping operation. The controller 4 compares the calculated estimated disturbance with a predetermined second threshold TH2 for balancer abnormality detection, and determines that the abnormality has occurred in the balancer 3 in the case where the estimated disturbance exceeds the second threshold. The second threshold TH2 for the balancer abnormality detection is set at such a value that the decline of the assist torque Tb due to the abnormality of the balancer 3 can be detected. The second threshold TH2 is, as illustrated in FIG. 4, a value larger than the estimated disturbance during the standby of the robot 2 in the normal situation of the balancer 3, but is set at the value sufficiently smaller than the first threshold TH1 for the collision detection.

Figure 5:
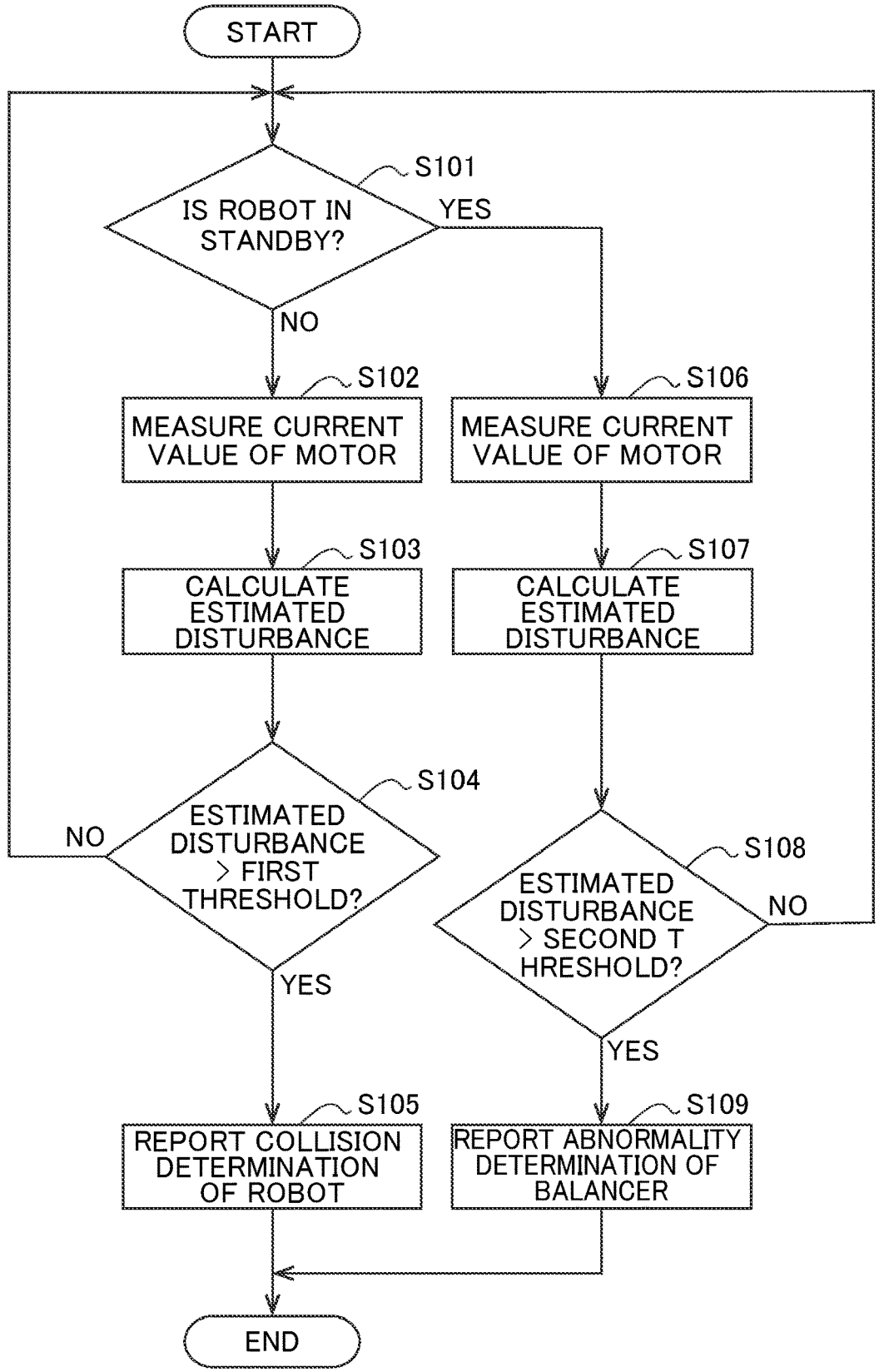
FIG. 5 is a flowchart describing a robot collision detection operation and a balancer abnormality detection operation.

Next, a specific operation of the balancer abnormality detection system 1 constituted in this way will be described with reference to a flowchart illustrated in FIG. 5. The controller 4 supplies a predetermined current command value to the servomotor 26 of the robot 2 according to a predetermined operation program, and operates the robot 2. The controller 4 monitors whether the robot 2 is in standby or not after the operation of the robot 2 is started (S101).

In Step S101, in the case where the robot 2 is in standby, that is, in the case where the robot 2 is in operation (Step S101: NO), the controller 4 measures and acquires the current value of the servomotor 26 in the predetermined control cycle (S102). Thereafter, the controller 4 calculates the estimated disturbance which is the difference between the acquired current value and the current command value supplied to the servomotor 26 necessary for performing the robot operation (S103).

The controller 4 compares the calculated estimated disturbance with the first threshold TH1 for the collision detection, and determines whether or not the estimated disturbance exceeds the first threshold TH1 (S104). In Step S104, in the case where the estimated disturbance does not exceed the first threshold TH1 (Step S104: NO), the controller 4 returns processing to Step S101.

In Step S104, in the case where the estimated disturbance exceeds the first threshold TH1 (Step S104: YES), the controller 4 determines that the robot 2 has collided with an external object, and reports collision determination of the robot 2 (S105). To report the collision determination of the robot 2, for example, display to report collision occurrence of the robot 2 is performed on a monitor screen 41 provided on the controller 4 as illustrated in FIG. 1.

In Step S101, in the case where the robot 2 is in standby (Step S101: YES), the controller 4 measures and acquires the current value of the servomotor 26 in the predetermined control cycle (S106). Thereafter, the controller 4 calculates the estimated disturbance which is the difference between the acquired current value and the current command value supplied to the servomotor 26 necessary for keeping the posture of the robot 2 (S107).

The controller 4 compares the calculated estimated disturbance with the second threshold TH2 for the balancer abnormality detection, and determines whether or not the estimated disturbance exceeds the second threshold TH2 (S108). In Step S108, in the case where the estimated disturbance does not exceed the second threshold TH2 (Step S108: NO), the controller 4 returns the processing to Step S101.

In Step S108, in the case where the estimated disturbance exceeds the second threshold TH2 (Step S108: YES), the controller 4 determines that some kind of abnormality such as breakage of the coil springs 33 and 34 has occurred in the balancer 3, and reports abnormality determination of the balancer 3 (S109). To report the abnormality determination of the balancer 3, for example, display to report that there is abnormality in the balancer 3 is performed on the monitor screen 41 provided on the controller 4 as illustrated in FIG. 1.

In such a manner, according to the abnormality detection system 1 and abnormality detection method of the balancer 3, the system 1 includes: the robot 2; the servomotor 26 configured to operate the robot 2; the balancer 3 provided in the robot 2 and configured to generate the assist torque which assists the power of the servomotor 26 with the force generated by the elastic bodies (coil springs 33 and 34); and the controller 4 configured to detect the abnormality of the balancer 3 by measuring the current value of the servomotor 26 operated to keep the posture of the robot 2 during the standby of the robot 2 and comparing the current value with the current command value of the servomotor 26 necessary for keeping the posture of the robot 2. Thus, it is possible to surely detect the abnormality of the balancer 3 in an early stage.

In addition, the controller 4 has the second threshold TH2 set at such a value that the decline of the assist torque due to the abnormality of the balancer 3 can be detected, calculates the estimated disturbance as the difference between the current value and the current command value during the standby of the robot 2, and determines that the balancer 3 is abnormal in the case where the estimated disturbance exceeds the second threshold TH2. Thus, just by newly storing the second threshold TH2 in the controller 4, the system capable of detecting the abnormality of the balancer 3 can be easily constructed utilizing the collision detection function provided in the controller 4.

The balancer 3 is not limited to the spring balancer using the coil springs 33 and 34 as the elastic bodies. The elastic bodies may be springs other than the coil springs.

Further, the balancer 3 may be a gas balancer using a gas spring as the elastic body.

EXPLANATION OF REFERENCE NUMERALS

1 Balancer abnormality detection system
2 Robot
26 Servomotor
3 Balancer
33, 34 Coil spring (elastic body)
4 Controller
TH2 Second threshold (threshold for balancer abnormality detection)

What is claimed is:

1. A balancer abnormality detection system comprising:
a robot;
a motor configured to operate the robot;
a balancer provided in the robot, provided with elastic bodies, and configured to generate assist torque which assists power of the motor with force generated by the elastic bodies; and
a controller configured to detect abnormality of the balancer by measuring a current value of the motor operated to keep a posture of the robot during standby of the robot and comparing the current value with a current command value of the motor necessary for keeping the posture of the robot.

2. The balancer abnormality detection system according to claim 1, wherein the controller has a threshold for balancer abnormality detection set at such a value that decline of the assist torque due to the abnormality of the balancer can be detected, calculates a difference between the current value and the current command value during the standby of the robot, and determines that the balancer is abnormal when the difference exceeds the threshold.

3. The balancer abnormality detection system according to claim 2, wherein the threshold for balancer abnormality detection is set smaller than a threshold for collision detection.

4. The balancer abnormality detection system according to claim 1, wherein the robot is in a state of stopping at a predetermined standby position after ending an operation until starting a next operation during the standby of the robot.

5. An abnormality detection method for a balancer provided in a robot operated by a motor and configured to generate assist torque which assists power of the motor by force generated by elastic bodies, the balancer abnormality detection method comprising: detecting abnormality of the balancer by measuring a current value of the motor operated to keep a posture of the robot during standby of the robot and comparing the current value with a current command value of the motor necessary for keeping the posture of the robot.

6. The balancer abnormality detection method according to claim 5, the method further comprising: calculating a difference between the current value and the current command value during the standby of the robot, and determining that the balancer is abnormal when the difference exceeds a threshold for balancer abnormality detection set at such a value that decline of the assist torque due to the abnormality of the balancer can be detected.

7. The balancer abnormality detection method according to claim 6, wherein the threshold for balancer abnormality detection is set smaller than a threshold for collision detection.

8. The balancer abnormality detection method according to claim 5, wherein the robot is in a state of stopping at a predetermined standby position after ending an operation until starting a next operation during the standby of the robot.

* * * * *